United States Patent Office 2,752,310

Patented June 26, 1956

1

2,752,310

HYDROPHOBIC SILICA BASE LUBRICANTS CONTAINING 1,3-DIOLS AS ANTI-GELATION AGENTS

John W. Blattenberger, Rosemont, Pa., assignor to Sun Oil Company, Philadelphia, Pa., a corporation of New Jersey No Drawing. Application July 13, 1953, Serial No. 367,727

4 Claims. (Cl. 252—28)

This invention relates to silica base lubricants and their preparation, and more particularly concerns improved lubricant compositions, such as greases, prepared by means of colloidal hydrophobic silica.

The preparation of thickened oils or greases by incorporating in an oil a suitable minor amount of colloidal silica is well known. Kistler Patent No. 2,260,625 describes the use for this purpose of colloidal silica which may be either in the form of an aerogel or a so-called petro-gel. The colloidal silica acts as a thickening or bodying agent, and a relatively small amount, such as 10% by weight of silica in the mixture, will yield a composition having the consistency of conventional soap greases.

Ordinarily silica is hydrophilic, having greater affinity for water than for oil. This is disadvantageous for lubricant manufacture, since the grease containing the hydrophilic silica will tend to break down or lose its rigidity in the presence of water as a result of preferential wetting of the silica by the water causing separation of silica from oil. Such greases hence are not suitable for use under service conditions where water is apt to be encountered.

In order to prepare silica base lubricants which are stable in the presence of water, it is known to employ silica which is hydrophobic rather than hydrophilic. Silica can be made hydrophobic in various ways generally involving the incorporation on its surfaces of a small amount of material which has no affinity for water. Examples of procedures for rendering silica hydrophobic appear in Pat. Nos. 2,583,603 and 2,583,606, wherein treatments of hydrophilic silica with materials such as styrene and alkyl silicon chloride are disclosed. Treatment of silica with various silane compounds such as described in Hirschler Pat. No. 2,614,135 also can be employed to render it water-proof. These and other procedures may be used in preparing colloidal hydrophobic silica for use in grease manufacture.

A disadvantage in using hydrophobic silica as the thickening agent in preparing grease is that the resulting compositions have considerable tendency to undergo gelation when used at high temperature. This is undesirable since the grease stiffens as gelation occurs and consequently may lose its lubricating effectiveness under service conditions involving relatively high temperatures.

The present invention is directed to overcoming this problem of high temperature gelation of greases prepared from hydrophobic silica. According to the invention, such gelation is substantially avoided or reduced by incorporating in the grease a minor amount of an aliphatic glycol having 6–12 carbon atoms per molecule and in which the hydroxyl groups are attached to carbon atoms separated from each other by one carbon atom. For example, aliphatic 1,3-diols, 2,4-diols, 3,5-diols, etc., can be used according to the invention. Preferred members

2 of the group specified are 2-alkyl substituted-1,3-diols such as the following: 2-methyl pentanediol-1,3; 2,2-diethyl propanediol-1,3; 2-ethyl hexanediol-1,3; 2-ethyl 2-butyl propanediol-1,3; 2-butyl heptanediol-1,3; and 2,2-dipropyl hexanediol-1,3. However, any other aliphatic glycol of 6–12 carbon atoms that has its hydroxyl groups on carbon atoms which are attached to a common carbon atom are operative for reducing high temperature gelation and can be used in practicing the invention.

In preparing a grease according to the invention, the amount of colloidal hydrophobic silica generally should be about 5–15% by weight of the oil-silica mixture, with about 10% usually being a preferred amount. The aliphatic diol is incorporated in the mixture in sufficient amount to inhibit gelation to the extent desired. The amount of diol will vary but usually should be in excess of 2.5% by weight based on the silica in order to have substantial effect on the gelation characteristics of the grease. On the same basis, 10% of the diol usually will stabilize the composition to substantial degree, and it is soldom necessary to add more than 50% for securing the desired results, although larger amounts may be desirable in some instances.

Considerable variation is permissible in the procedure and conditions under which the materials are compounded. The hydrophobic silica may be dispersed in the lubricating oil and the aliphatic glycol may then be added; or the glycol may be added to the oil first after which the hydrophobic silica is incorporated therein. In any event the materials should be subjected to sufficiently vigorous mixing to insure dispersion of the silica in essentially colloidal form. The mixing may be done at any convenient temperature ranging from room temperature up to a relatively high temperature, and any effective type of mixing device may be employed.

As specific examples of the invention, a series of compositions was prepared by incorporating in a base grease small amounts of various aliphatic diols as shown in Table I. The base grease was prepared by mixing 10 parts by weight of a colloidal hydrophobic silica, known commercially as "GS Hydrophobic Silica," in 90 parts of a solvent refined distillate oil having the following properties: S. U. viscosity @ 100° F.=515; V. I.=90; A. P. I. gravity=29; flash point=455° F.; fire point=515° F.; pour point=0° F. A Manton-Gaulin homogenizer was used to insure complete dispersion of the silica in the oil. Diols in the amounts listed in Table I were worked into samples of the base grease by hand mixing. Each sample was then heated and maintained at about 300° F. for seven hours. Thereafter penetrations of the heated material were determined before and after working it with a spatula on a flat surface. The difference in these penetration values of the heated grease was taken as an indication of the gelation characteristics of the material; the lower the difference the less being the gelation tendency. In these tests the penetrations were determined, according to the procedure described in an article appearing in Analytical Chemistry, vol. 22, page 1574 (1950), entitled "Improved miniature penetrometer cones for determining lubricating grease consistency," the procedure involving the use of a half scale cone as described in said article. Penetrations of the grease compositions before heating were also determined in the same manner.

Table I shows results obtained with the base grease and for samples prepared according to the invention. Table II shows comparative results employing glycols which are not considered satisfactory for use according to the invention.

*Table I*

| Glycol Added | Wt. Percent Glycol Based on Silica | Texture of Mixture | Penetration @ 77° F. | | | Penetration Change Upon Working |
|---|---|---|---|---|---|---|
| | | | Initial | Heated Unworked | Heated Worked | |
| (Base Grease) | | Smooth | 168 | 115 | 173 | +58 |
| 2-methyl pentanediol-2, 4 | 1.0 | do | 181 | 156 | 178 | +22 |
| | 2.0 | do | 174 | 157 | 173 | +16 |
| | 3.0 | do | 179 | 158 | 171 | +13 |
| | 6.0 | do | 183 | 164 | 167 | +3 |
| 2-methyl pentanediol-1, 3 | 1.0 | do | 179 | 153 | 175 | +22 |
| | 2.0 | do | 176 | 154 | 164 | +10 |
| | 3.0 | do | 179 | 154 | 165 | +11 |
| | 6.0 | do | 180 | 154 | 159 | +5 |
| 2, 2-diethyl propanediol-1, 3 | 1.0 | do | 185 | 168 | 181 | +13 |
| | 2.0 | do | 184 | 167 | 172 | +5 |
| 2-ethyl hexanediol-1, 3 | 0.5 | do | 193 | 162 | 197 | +35 |
| | 1.0 | do | 185 | 174 | 188 | +14 |
| | 2.0 | do | 185 | 181 | 189 | +8 |
| 2-ethyl-2-butyl propanediol-1, 3 | 1.0 | do | 187 | 172 | 187 | +15 |
| | 2.0 | do | 181 | 179 | 184 | +4 |

*Table II*

| Glycol Added | Wt. Percent Glycol Based on Silica | Texture of Mixture | Penetration @ 77° F. | | | Penetration Change Upon Working |
|---|---|---|---|---|---|---|
| | | | Initial | Heated Unworked | Heated Worked | |
| Ethylene Glycol | 2.0 | Granular | 168 | 95 | 122 | +27 |
| Butanediol-1, 3 | 2.0 | do | 172 | 128 | 148 | +20 |
| Butanediol-2, 3 | 2.0 | do | 174 | 129 | 155 | +26 |
| Pentanediol-1, 5 | 2.0 | do | 176 | 126 | 159 | +33 |
| Pentanediol-2, 4 | 2.0 | do | 174 | 135 | 157 | +22 |
| Diisobutylene glycol-3, 4 | 2.0 | Smooth | 185 | 122 | 179 | +57 |

The results in Table I show that each of the glycols there listed is effective for the purpose of preventing undue gelation or stiffening of the grease during heating. While the base grease had a +58 change in penetration upon working of the heated material, the glycol-containing compositions of Table I exhibited much lower penetration changes. Furthermore, these compositions were all of smooth, non-granular texture desirable for a grease product.

By way of comparison, the results in Table II indicate that the glycols there listed are not satisfactory for use according to the invention. While the five glycols listed in Table II which had less than six carbon atoms effected some reduction in the penetration difference between worked and unworked material, they are unsuitable because the compositions containing them are granular and crumbly. On the other hand, the diisobutylene glycol, which has eight carbon atoms but has its hydroxyl groups on adjacent carbon atoms at the 3,4-positions, does not adversely affect the texture of the mixture; but it has essentially no effect in preventing gelation as shown by the +57 penetration change.

I claim:

1. A grease composition comprising a major proportion of lubricating oil, colloidal hydrophobic silica gel dispersed therein in minor proportion sufficient to substantially thicken the composition, and a small amount sufficient to inhibit gelation upon heating of the composition of an aliphatic diol having 6–12 carbon atoms per molecule and having its hydroxyl groups attached to carbon atoms which are separated by one carbon atom.

2. A grease according to claim 1 in which the diol is a 2-alkyl substituted-1,3-diol.

3. A grease composition comprising a major per cent of lubricating oil, 5–15% of colloidal hydrophobic silica gel dispersed therein, and an aliphatic diol having 6–12 carbon atoms per molecule and having its hydroxyl groups attached to carbon atoms which are separated by one carbon atom, said diol being present in amount effective to inhibit gelation upon heating of the composition.

4. Method of inhibiting gelation of a silica base lubricating composition comprising a minor amount, sufficient to substantially thicken the composition, of colloidal hydrophobic silica gel dispersed in a major amount of lubricating oil, which method comprises incorporating in such composition a small amount sufficient to inhibit gelation upon heating of the composition of an aliphatic diol having 6–12 carbon atoms per molecule and having its hydroxyl groups attached to carbon atoms which are separated by one carbon atom.

References Cited in the file of this patent

UNITED STATES PATENTS 2,573,650 Peterson et al. ---------- Oct. 30, 1951